United States Patent [19]

Hamanishi

[11] Patent Number: 4,621,909
[45] Date of Patent: Nov. 11, 1986

[54] PHOTOGRAPHIC LENS OF A GREAT APERTURE RATIO

[75] Inventor: Yoshinari Hamanishi, Tokyo, Japan

[73] Assignee: Nippon Kogaku K.K., Tokyo, Japan

[21] Appl. No.: 485,481

[22] Filed: Apr. 15, 1983

[30] Foreign Application Priority Data

Apr. 26, 1982 [JP] Japan .................................. 57-70124

[51] Int. Cl.⁴ ............................. G02B 9/62; G02B 9/64
[52] U.S. Cl. ..................................................... 350/464
[58] Field of Search .................................. 350/464, 463

[56] References Cited

U.S. PATENT DOCUMENTS 4,260,223 4/1981 Hamanishi ............................ 350/465
4,553,823 11/1985 Kato et al. ............................ 350/464

FOREIGN PATENT DOCUMENTS 138823 11/1975 Japan .
 75613  6/1981 Japan .
107209  8/1981 Japan .

Primary Examiner—John K. Corbin
Assistant Examiner—Rebecca D. Gass
Attorney, Agent, or Firm—Shapiro and Shapiro

[57] ABSTRACT

A photographic lens of a great aperture ratio comprises, in succession from the object side, a first unit having a positive refractive power, a second unit having a positive refractive power, a third unit having a positive refractive power, and a stop member disposed between the first unit and the second unit. The first, second and third units are movable at different speeds toward the object side relative to the image plane during the shift from the infinity photography condition to the short distance photography condition. The photographic lens satisfies certain conditions.

10 Claims, 7 Drawing Figures

PHOTOGRAPHIC LENS OF A GREAT APERTURE RATIO

BACKGROUND OF THE INVENTION

1. Field of the Invention

This invention relates to a photographic lens of a great aperture ratio, and in particular to a short distance correcting system therefor.

2. Description of the Prior Art

Photographic lenses of a great aperture ratio suffer from great deterioration of the aberrations for short distance objects and therefore cannot be said to be sufficient in short distance photographing performance, and have had a difficulty even for the order of 1/10 times in respect of the photographing performance during the opening of the stop. Therefore, to prevent deterioration of the short distance photographing performance, various short distance correcting systems have been adopted and attempts to improve the short distance photographing performance have been made. However, the balance of astigmatism and coma has been still insufficient and further, there has been the disadvantage that the fluctuation of the lateral chromatic aberration from the infinity photography to the closest distance photography is great due to the fact that a short distance correcting system has been practised.

For example, in the short distance correcting system disclosed in Japanese Laid-open Patent Application No. 138823/1975, the rearmost positive lens component of the lens system is moved at a speed lower than the movement speed of the entire system, and in the lens of a great aperture ratio disclosed in Japanese Laid-open Patent Application No. 75613/1981, the rearmost positive lens component of the lens system is fixed and only the lens units forward thereof are made movable and, in both of these systems, the air space immediately forward of the rearmost lens component of the lens system is made great at the short distance. In these systems, however, it is easy to reduce the amount of coma of the group of light rays on the lower side (outer side) of the principal ray, but it is difficult to well balance the coma resulting from the group of light rays on the upper side (inner side) of the principal ray and also great fluctuation of lateral chromatic aberration has been unavoidable. Also, a correcting system whereby the stop space is enlarged in a lens system comprising a first and a second positive lens unit with a stop disposed therebetween as is disclosed in Japanese Laid-open Patent Application No. 107209/1981 is most effective for correction of a fluctuation of lateral chromatic aberration, whereas in such system, conversely to the above-described systems, correction of the coma resulting from the group of light rays on the upper side (inner side) of the principal ray has been possible but correction of the coma resulting from the group of light rays on the lower side (outer side) of the principal ray has been difficult.

SUMMARY OF THE INVENTION

It is an object of the present invention to overcome the above-noted disadvantage as much as possible and to improve the short distance photographing performance and also improve the open imaging performance at infinity.

It is another object of the present invention to provide a photographic lens which is simple in lens construction and yet maintains an excellent performance in infinity photography as well as in short distance photography.

The invention will become fully apparent from the following detailed description thereof taken in conjunction with the accompanying drawings.

DESCRIPTION OF THE PREFERRED EMBODIMENTS

Figure 1:
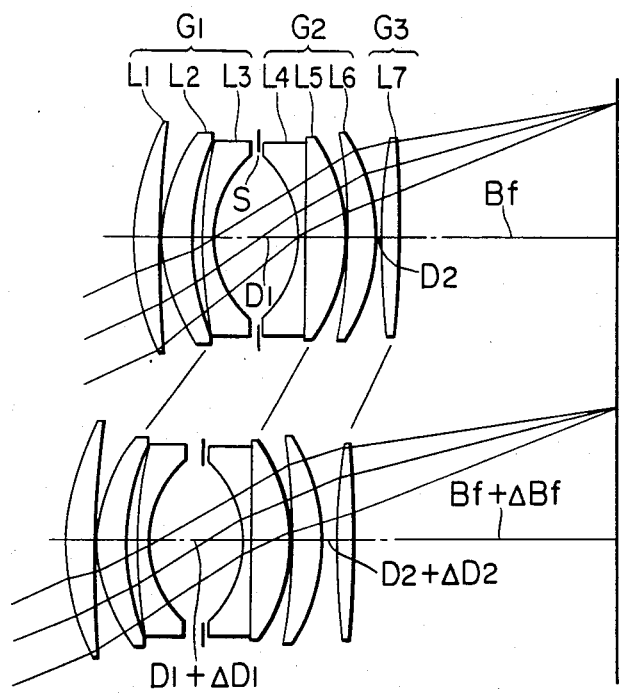
FIG. 1 shows the specific construction of a photographic lens according to the present invention.

The short distance corrected photographic lens of a great aperture ratio according to the present invention is an optical system which, as shown in FIG. 1, has, in succession from the object side, a first unit G1, a second unit G2 and a third unit G3 each having a positive refractive power and has a stop S between the first unit and the second unit and in which when the lens shifts from the infinity photography condition to the short distance photography condition, the first, second and third units are moved at different speeds toward the object side relative to the image plane. The speeds of movement of these groups for the focusing satisfy the following conditions:

$$1.5 < \alpha < 9 \tag{1}$$

$$0.2 < \beta < 3.0 \tag{2}$$

where when the amounts of variation in the spacings between the respective units during the focusing to the infinity object to the closest distance object are:

$\Delta D_1$: the amount of variation in the spacing between the first and the second unit $\Delta D_2$: the amount of variation in the spacing between the second and the third unit $\Delta B_f$: the amount of variation in the spacing between the third unit and the image plane, namely, the back focal length, $\alpha$ and $\beta$ are defined as follows:

$$\alpha = \Delta B_f / \Delta D_1$$

$$\beta = \Delta D_2 / \Delta D_1$$

Generally, in a lens of the whole axial movement type, it has been found that during the short distance focusing, outward coma occurs and this greatly deteriorates the short distance imaging performance. Therefore, in the present invention, the spacing between the first unit G1 and the second unit G2 is widened by a predetermined amount during short distance photography to thereby cause inward coma to occur in the group of light rays on the upper side (inner side) of the principal ray and the spacing between the second unit G2 and the third unit G3 is widened by a predetermined amount to thereby cause inward coma to occur in the group of light rays on the lower side (outer side) of the principal ray, thereby negating the outward coma occuring in the lens of the whole axial movement type and thus improving the performance thereof during the short distance photography. Actually, during the shift from the infinity photography condition to the short distance photography condition, the amount of movement of the first lens unit is greater than that of said second lens unit, and the amount of movement of the second lens unit is greater than that of the third lens unit. In FIG. 1, an oblique light beam of a maximum angle of view is shown to facilitate the understanding of what has been described above.

If the upper limit of condition (1) is exceeded, the amount of correction of the spacing between the first unit G1 and the second unit G2 will become too small to obtain a sufficient effect of correction and the correction of the outward coma will be insufficient. If the lower limit of condition (1) is exceeded, the amount of correction will become excessive and excessive astigmatism will occur in the negative sense and further, excessive inward coma will occur in the light rays on the upper side of the principal ray.

If the upper limit of condition (2) is exceeded, the amount of correction of the spacing between the second unit G2 and the third unit G3 will become excessively great and astigmatism will occur excessively in the positive sense and excessively great inward coma will occur in the light rays on the lower side of the principal ray and further, chromatic difference of magnification will fluctuate excessively. On the other hand, if the lower limit of condition (2) is exceeded, the effect of correction of the spacing will not be obtained sufficiently and it will be difficult to sufficiently correct the outward coma in the group of light rays on the lower side of the principal ray.

Also, in the present invention, when $\gamma = \Delta B_f/\Delta D_2$ is defined, it is desirable to satisfy $2.5 < \gamma < 4.5$.

In the construction of the present invention as described above, it is desirable to further satisfy the following conditions:

$$2.40 < f_1/f < 4.50 \quad (3)$$

$$1.41 < f_2/f < 1.80 \quad (4)$$

$$1.70 < f_3/f < 3.0 \quad (5)$$

where $f_1$, $f_2$ and $f_3$ are the focal lengths of the first unit G1, the second unit G2 and the third unit G3, respectively, and f is the total focal length of the entire system during the infinity focusing.

Condition (3) prescribes an appropriate refractive power distribution of the first unit G1. If the lower limit of this condition is exceeded, it will become difficult to secure a sufficient back focal length, as a lens of a great aperture ratio, a sufficient air space, center thickness and edge thickness of the lens and thus, undesirably, it will become difficult to provide the lens system with a great aperture ratio. On the other hand, if the upper limit of condition (3) is exceeded, the on-axis light beam from the object will become a divergent light beam in the stop space in a relatively low magnification condition and thus, correction of aberrations will become difficult and eventually, the close distance will become longer, and this is not preferable. Also, in the second unit G2 and subsequent unit, spherical aberration will become liable to occur in the short distance photography condition and will thus become difficult to correct and further, chromatic difference of magnification will greatly fluctuate in the short distance photography condition and will become difficult to correct.

Condition (4) prescribes an appropriate refractive power distribution of the second unit G2. If the lower limit of this condition is exceeded, spherical aberration will become excessively negative in the short distance and will become difficult to correct, and if the upper limit of this condition is exceeded, spherical aberration will undesirably become excessively positive.

Condition (5) is a condition which prescribes an appropriate refractive power distribution of the third unit G3 and enables correction of astigmatism, coma and distortion.

In the present invention as described above, each unit is constructed with a so-called modified Gauss type photographic lens as the basis. That is, the first unit G1 is constituted by a positive lens L1 having its surface of sharper curvature facing the object side, a positive meniscus lens L2 having its convex surface facing the object side, and a negative meniscus lens L3 having its convex surface facing the object side, the second unit G2 is constituted by a negative lens L4 having its concave surface of sharper curvature facing the object side, a positive lens L5 cemented thereto and having its surface of sharper curvature facing the image side, and a positive meniscus lens L6 having its convex surface facing the image side, and the third unit G3 is constituted by a positive lens L7. It is advantageous for aberration correction as a photographic lens of a great aperture ratio that the positive lens L1 most adjacent to the object side is a positive meniscus lens having its convex surface facing the object side. Also, it leads to simplest construction that the third unit G3 most adjacent to the image side is a single biconvex positive lens and, even if the third unit G3 is constituted by a plurality of lenses, the back focal length thereof will only become shorter and it will not much contribute to the correction of the fluctuation of chromatic aberration. It is desirable that the refractive index of the single positive lens as the third unit G3 be 1.6 or higher. If this refractive index is less than 1.6, the Petzval sum will become excessively great in the positive sense and this is disadvantageous for correction of astigmatism and coma.

Any of first, second and third embodiments each comprising such a construction is a so-called standard lens, and in the first and second embodiments, F-number is 1.4 and the photographing magnification $\beta$ at the closest distance is $\beta = -0.15$, and in the third embodiment, F-number is 1.2 which means a very great aperture ratio and the photographing magnification $\beta$ at the closest distance is $\beta = -0.1$. The numerical data of the respective embodiments will be shown in Tables 1 to 3 below. In these tables, $r_1$, $r_2$, $r_3$, ... represent the radii of curvature of the successive lens surfaces from the object side, $d_1$, $d_2$, $d_3$, ... represent the center thicknesses and air spaces of the respective lenses, $n_1$, $n_2$, $n_3$, ... and $v_1$, $v_2$, $v_3$, ... represent the refractive indices and Abbe numbers, respectively, of the respective lenses, and $d_0$ represents the object distance from the foremost lens surface.

TABLE 1

(First Embodiment)
Focal length f = 51.6 F-number 1.4 Angle of view 2w = 46°

| | | | | |
|---|---|---|---|---|
| $r_1$ = 41.885 | $d_1$ = 4.8 | $n_1$ = 1.79668 | $v_1$ = 45.5 | $L_1$ |
| $r_2$ = 323.526 | $d_2$ = 0.1 | | | |
| $r_3$ = 27.794 | $d_3$ = 5.0 | $n_2$ = 1.79631 | $v_2$ = 41 | $L_2$ $G_1$ |
| $r_4$ = 41.731 | $d_4$ = 1.7 | | | |
| $r_5$ = 86.627 | $d_5$ = 1.6 | $n_3$ = 1.69895 | $v_3$ = 30.1 | $L_3$ |

TABLE 1-continued (First Embodiment)
Focal length f = 51.6  F-number 1.4  Angle of view 2w = 46°

| | | | | |
|---|---|---|---|---|
| $r_6 = 18.136$ | $d_6 =$ variable ($D_1$) | | | |
| $r_7 = -17.038$ | $d_7 = 1.0$ | $n_4 = 1.72825$ | $v_4 = 28.3$ | $L_4$ |
| $r_8 = -400.000$ | $d_8 = 7.0$ | $n_5 = 1.79668$ | $v_5 = 45.5$ | $L_5$ |
| $r_9 = -27.275$ | $d_9 = 0.2$ | | | |
| $r_{10} = -105.064$ | $d_{10} = 4.4$ | $n_6 = 1.71300$ | $v_6 = 54$ | $L_6$ |
| $r_{11} = -31.505$ | $d_{11} =$ variable ($D_2$) | | | |
| $r_{12} = 125.000$ | $d_{12} = 2.8$ | $n_7 = 1.77279$ | $v_7 = 49.4$ | $L_7$-$G_3$ |
| $r_{13} = -210.375$ | $B_f =$ variable | | | |

Stop S is located 7.0 ahead of surface $r_7$.

| | $f = 51.6$ | $\beta = -0.15$ | |
|---|---|---|---|
| $d_0$ | ∞ | 359.714 | |
| $d_6$ | 15.195 | 16.776 | $\Delta D_1 = 1.581$ |
| $d_{11}$ | 0.916 | 3.083 | $\Delta D_2 = 2.167$ |
| $B_f$ | 38.119 | 45.077 | $\Delta B_f = 6.958$ |
| | $\alpha = 4.40$ | | $f_1 = 177.768$ |
| | $\beta = 1.37$ | | $f_2 = 85.103$ |
| | | | $f_3 = 101.835$ |

TABLE 2

(Second Embodiment)
Focal length f = 51.6  F-number 1.4  Angle of view 2w = 45.8°

| | | | | |
|---|---|---|---|---|
| $r_1 = 54.000$ | $d_1 = 4.5$ | $n_1 = 1.77279$ | $v_1 = 49.4$ | $L_1$ |
| $r_2 = 3692.059$ | $d_2 = 0.1$ | | | |
| $r_3 = 26.393$ | $d_3 = 5.0$ | $n_2 = 1.87739$ | $v_2 = 38.1$ | $L_2$ |
| $r_4 = 41.356$ | $d_4 = 1.8$ | | | |
| $r_5 = 85.078$ | $d_5 = 1.5$ | $n_3 = 1.69895$ | $v_3 = 30.1$ | $L_3$ |
| $r_6 = 18.695$ | $d_6 =$ variable ($D_1$) | | | |
| $r_7 = -17.947$ | $d_7 = 1.5$ | $n_4 = 1.75520$ | $v_4 = 27.6$ | $L_4$ |
| $r_8 = -200.000$ | $d_8 = 6.2$ | $n_5 = 1.78797$ | $v_5 = 47.5$ | $L_5$ |
| $r_9 = -27.271$ | $d_9 = 0.1$ | | | |
| $r_{10} = -142.734$ | $d_{10} = 4.6$ | $n_6 = 1.77279$ | $v_6 = 49.4$ | $L_6$ |
| $r_{11} = -33.578$ | $d_{11} =$ variable ($D_2$) | | | |
| $r_{12} = 143.000$ | $d_{12} = 2.2$ | $n_7 = 1.80411$ | $v_7 = 46.4$ | $L_7$-$G_3$ |
| $r_{13} = -519.733$ | $B_f =$ variable | | | |

Stop S is located 6.7 ahead of surface $r_7$.

| | $f = 51.6$ | $\beta = -0.15$ | |
|---|---|---|---|
| $d_0$ | ∞ | 365.642 | |
| $d_6$ | 13.4 | 15.416 | $\Delta D_1 = 2.016$ |
| $d_{11}$ | 0.8 | 2.413 | $\Delta D_2 = 1.613$ |
| $B_f$ | 38.356 | 45.210 | $\Delta B_f = 6.854$ |
| | $\alpha = 3.40$ | | $f_1 = 155.502$ |
| | $\beta = 0.80$ | | $f_2 = 73.483$ |
| | | | $f_3 = 139.671$ |

TABLE 3

(Third Embodiment)
Focal length f = 51.6  F-number 1.2  Angle of view 2w = 46.4°

| | | | | |
|---|---|---|---|---|
| $r_1 = 47.070$ | $d_1 = 5.3$ | $n_1 = 1.79668$ | $v_1 = 45.5$ | $L_1$ |
| $r_2 = 184.282$ | $d_2 = 0.6$ | | | |
| $r_3 = 29.920$ | $d_3 = 7.15$ | $n_2 = 1.79631$ | $v_2 = 41.0$ | $L_2$ |
| $r_4 = 50.500$ | $d_4 = 2.0$ | | | |
| $r_5 = 60.500$ | $d_5 = 1.0$ | $n_3 = 1.71736$ | $v_3 = 29.5$ | $L_3$ |
| $r_6 = 17.728$ | $d_6 =$ variable ($D_1$) | | | |
| $r_7 = -17.500$ | $d_7 = 1.3$ | $n_4 = 1.75520$ | $v_4 = 27.6$ | $L_4$ |
| $r_8 = 1000.000$ | $d_8 = 8.45$ | $n_5 = 1.77279$ | $v_5 = 49.4$ | $L_5$ |
| $r_9 = -28.000$ | $d_9 = 0.1$ | | | |
| $r_{10} = -142.000$ | $d_{10} = 6.8$ | $n_6 = 1.77279$ | $v_6 = 49.4$ | $L_6$ |
| $r_{11} = -35.940$ | $d_{11} =$ variable ($D_2$) | | | |
| $r_{12} = 92.000$ | $d_{12} = 3.3$ | $n_7 = 1.7443$ | $v_7 = 49.5$ | $L_7$-$G_3$ |
| $r_{13} = -277.852$ | $B_f =$ variable | | | |

Stop S is located 8.7 ahead of surface $r_7$.

| | $f = 51.610$ | $\beta = -0.1$ | |
|---|---|---|---|
| $d_0$ | ∞ | 514.966 | |
| $d_6$ | 17.6 | 18.251 | $\Delta D_1 = 0.651$ |
| $d_{11}$ | 0.516 | 2.003 | $\Delta D_2 = 1.487$ |
| $B_f$ | 38.049 | 42.756 | $\Delta B_f = 4.707$ |
| | $\alpha = 7.23$ | | $f_1 = 198.631$ |
| | $\beta = 2.28$ | | $f_2 = 81.922$ |
| | | | $f_3 = 93.198$ |

Figure 2A:
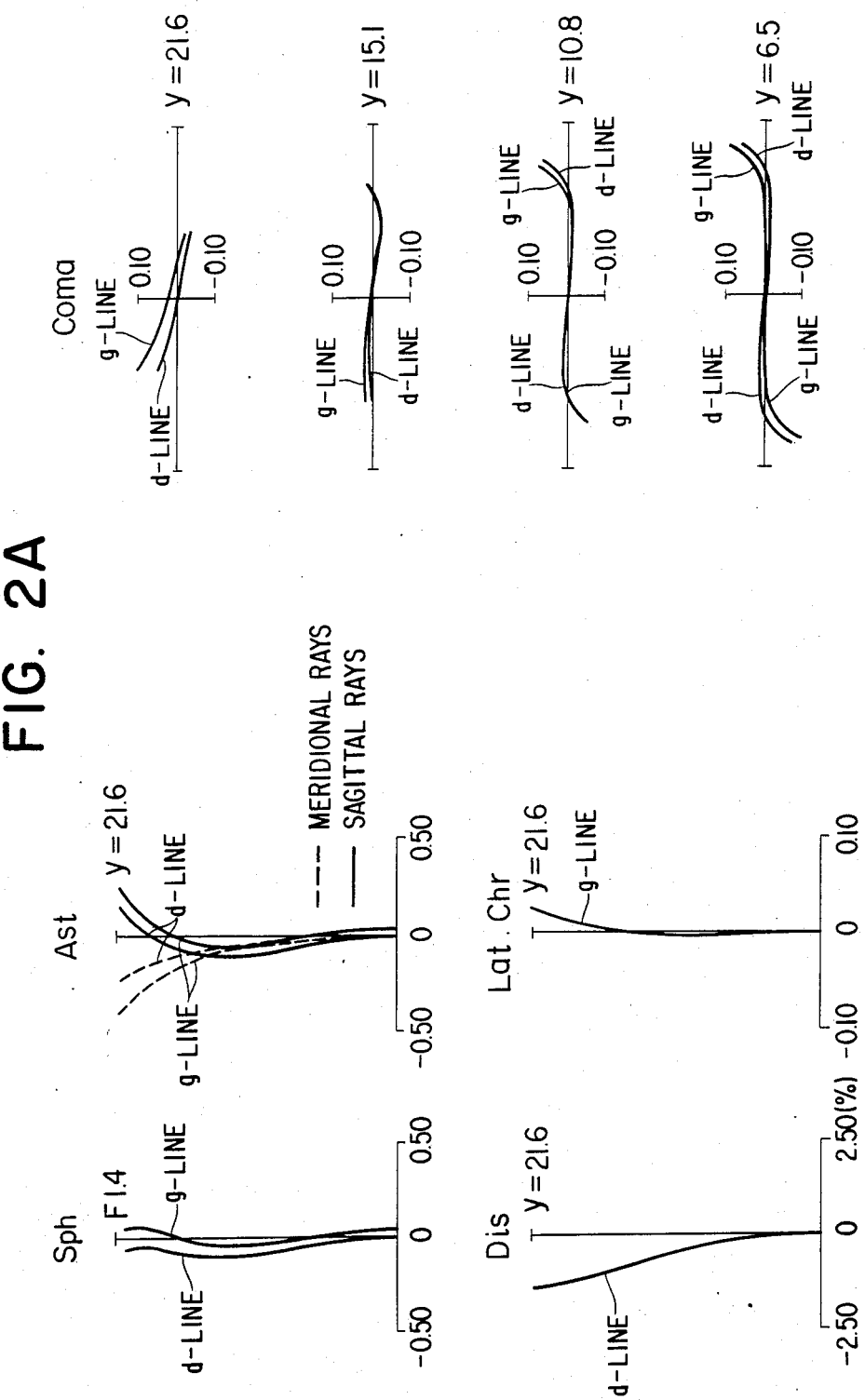
FIGS. 2A, 3A and 4A show the various aberrations in first, second and third embodiments, respectively, of the present invention in the infinity in-focus state.
Figure 2B:
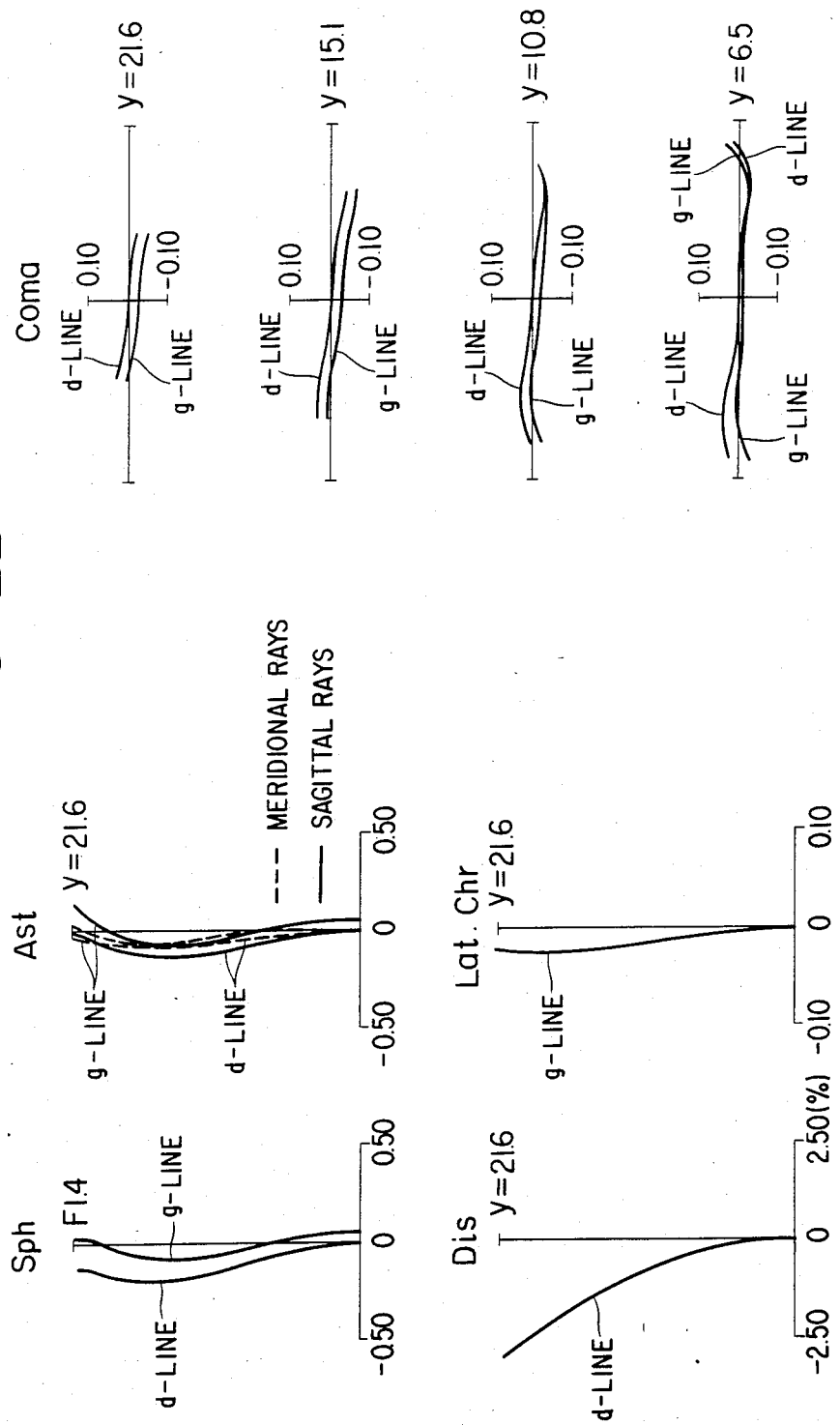
FIGS. 2B, 3B and 4B show the various aberrations in the first, second and third embodiments, respectively, of the present invention in the closest distance in-focus state.
Figure 3A:
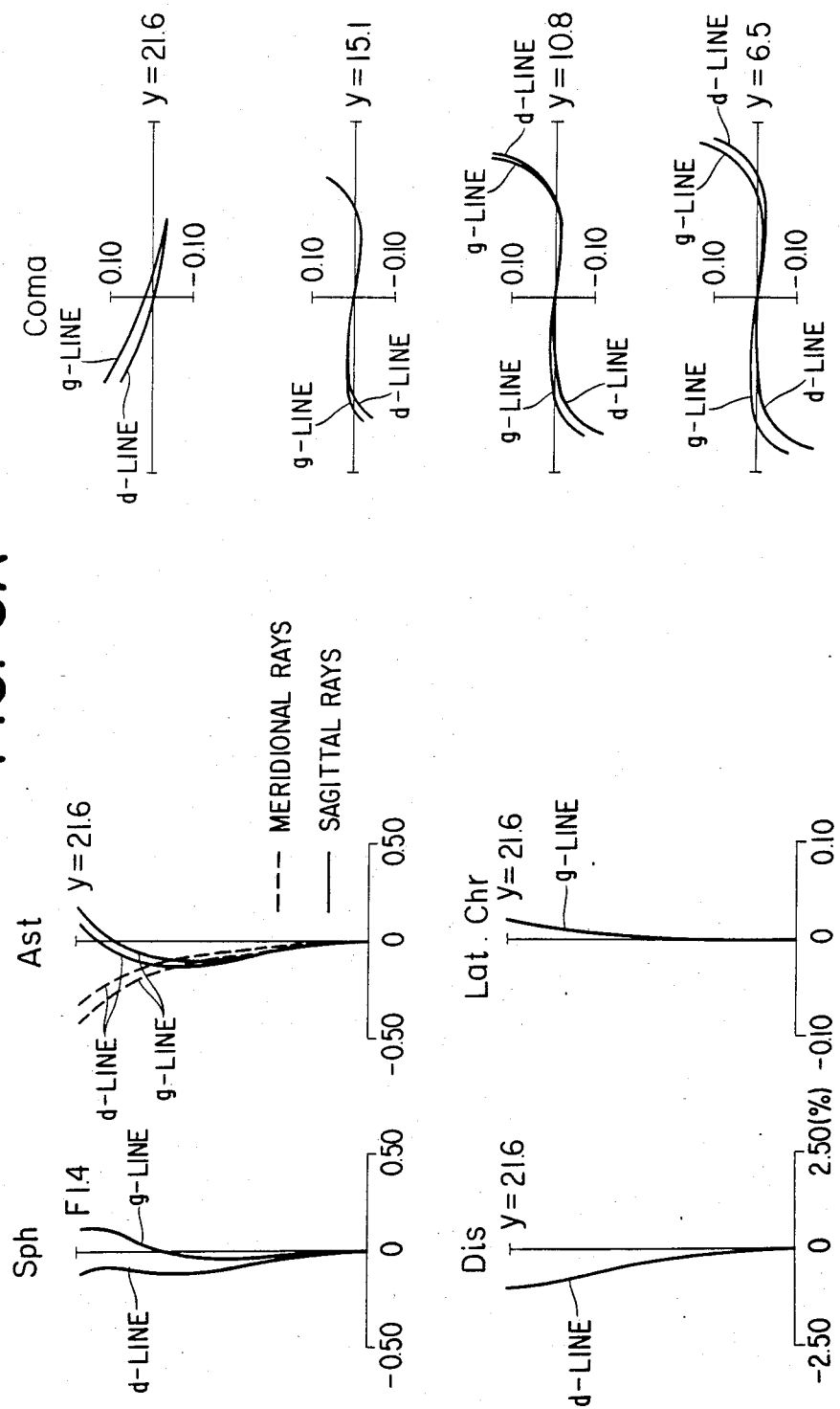
Figure 3B:
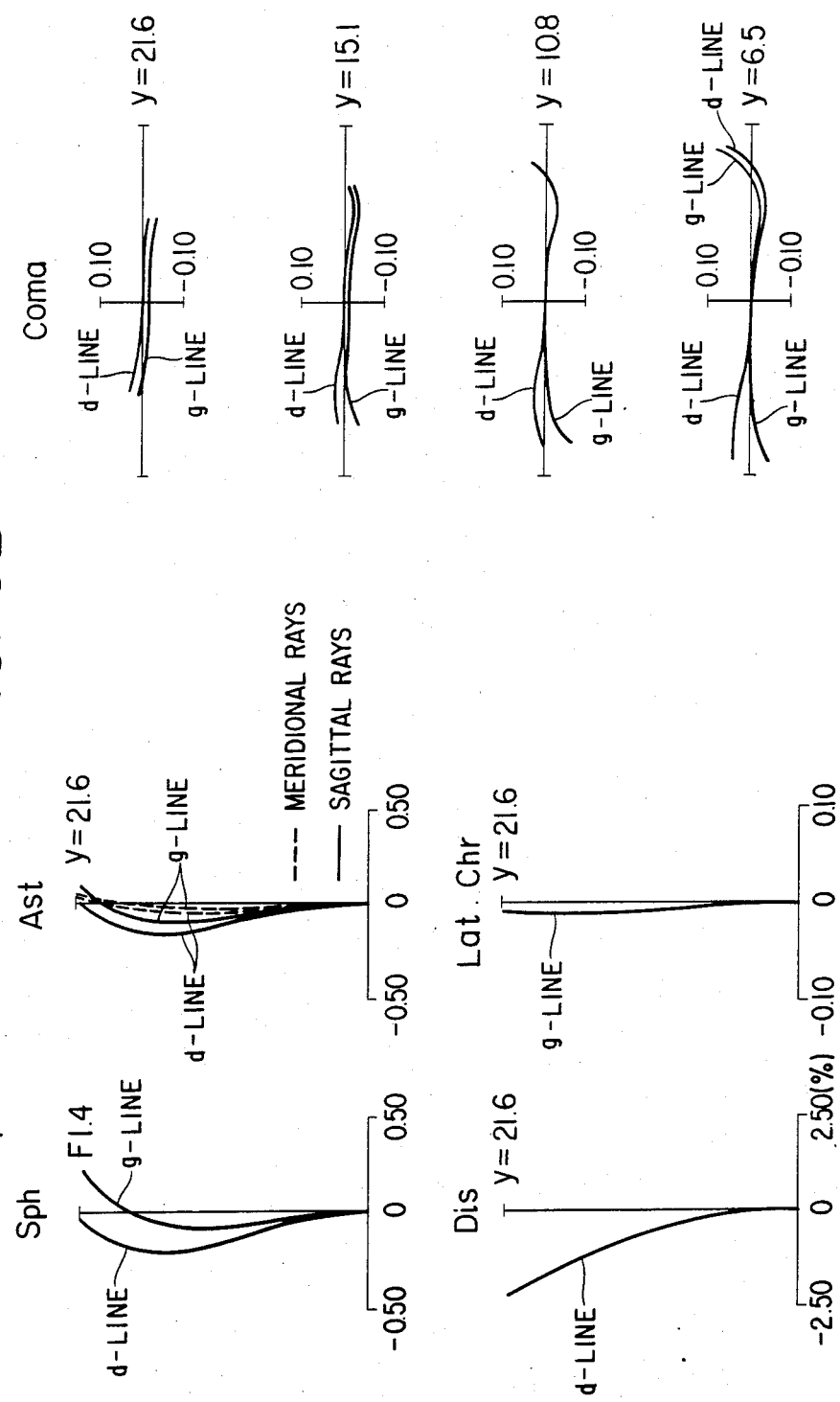
Figure 4A:
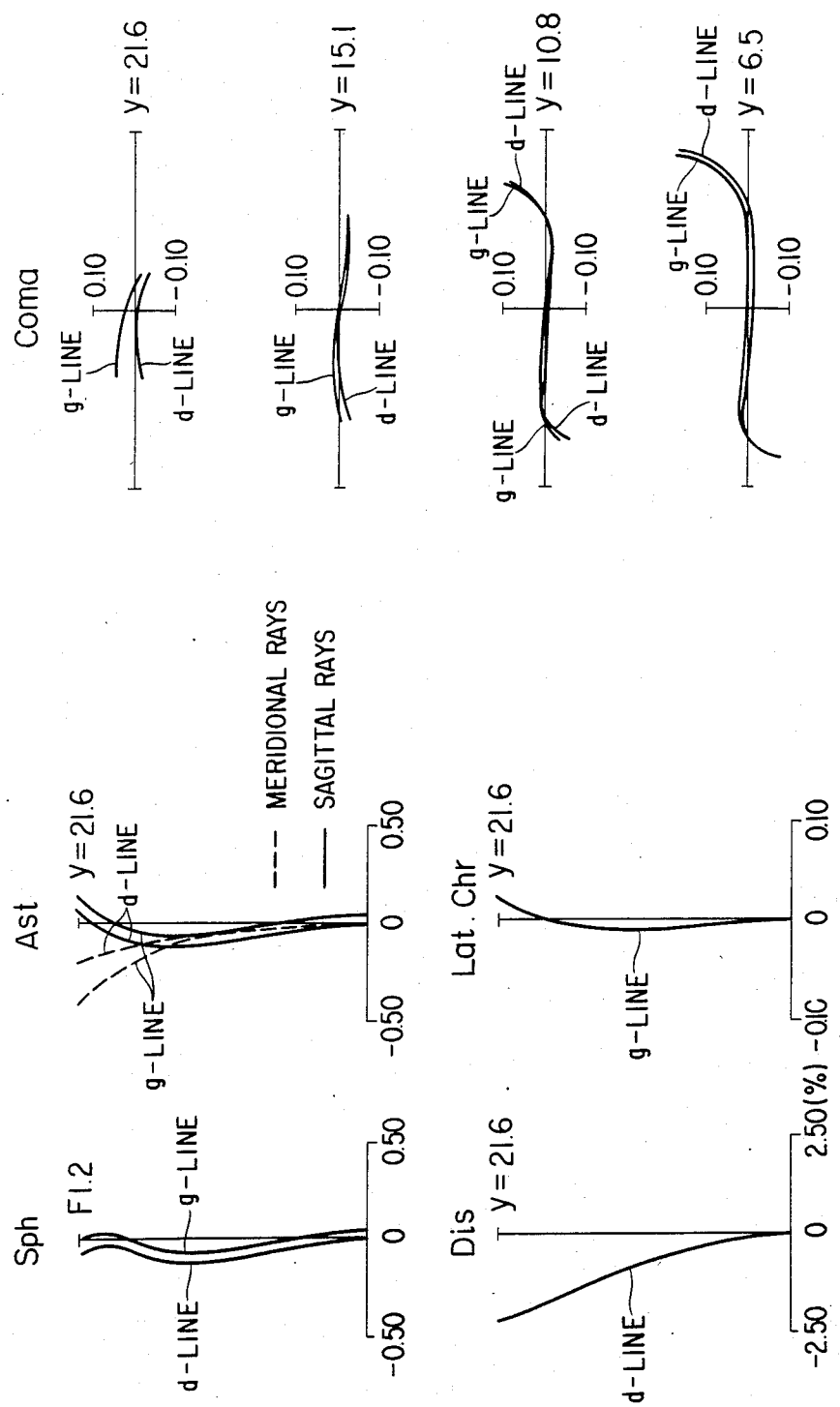
Figure 4B:
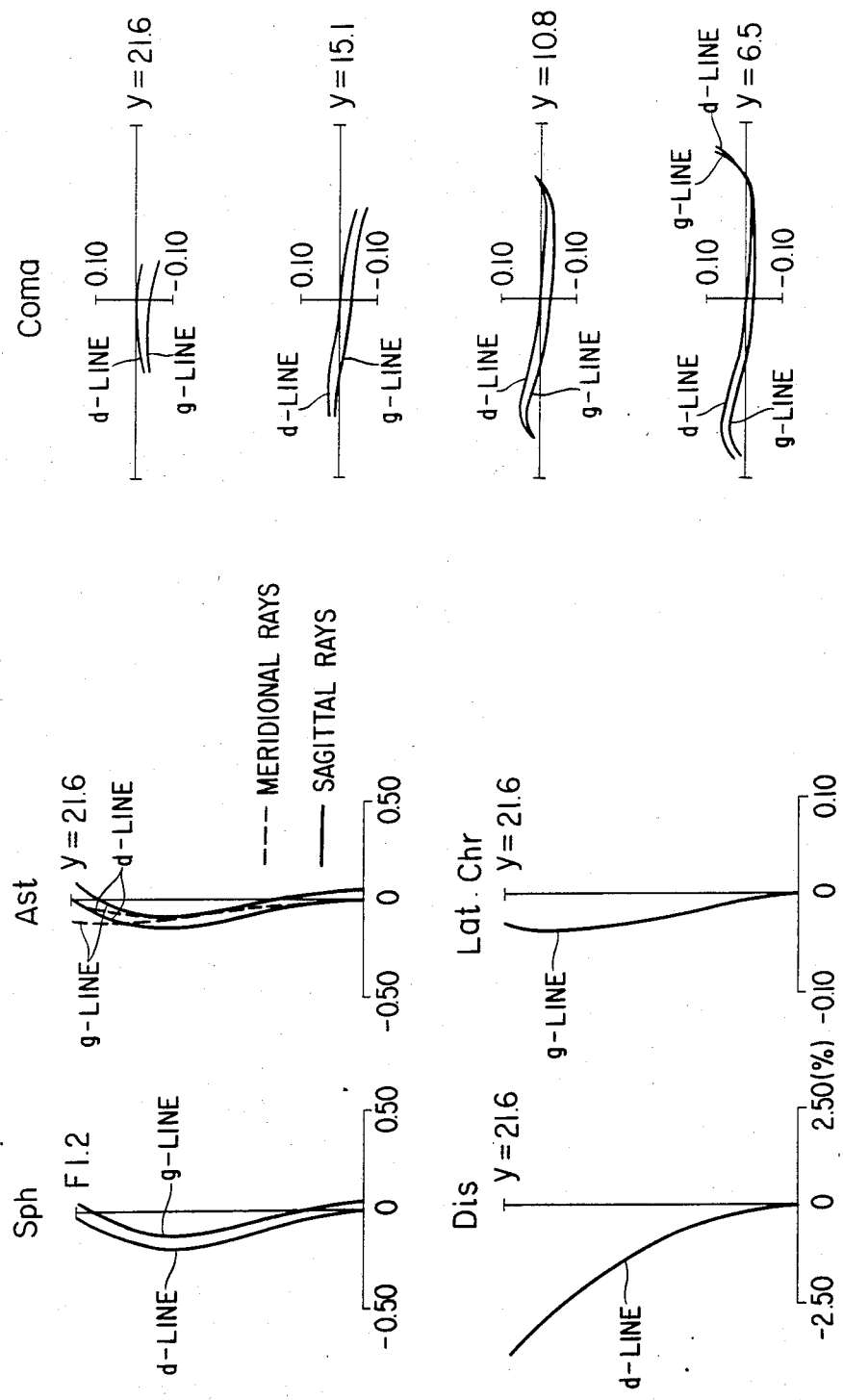

The various aberrations in the first to third embodiments during the infinity focusing are shown in FIGS. 2A, 3A and 4A, respectively. Also, the various aberrations in these embodiments during the closest distance focusing are shown in FIGS. 2B, 3B and 4B, respectively. In these Figures, Sph represents spherical aberration. Ast represents astigmatism, Dis represents distortion, and Lat. Chr represents lateral chromatic aberration. From comparison between these Figures, it is apparent that the photographic lens according to the present invention maintains an excellent imaging performance not only for infinity but also for the close distance in spite of its having a very great aperture ratio.

As described above, in the present invention, the merits of the two conventional short distance correction systems are optimally balanced, whereby the imaging performance during the short distance photography can be improved and the closest distance can be shortened while, at the same time, the imaging performance at infinity can be improved. Also, in the short distance photography, the variation in a plurality of air spaces is adopted as the degree of freedom of aberration correction, whereby allowance can be provided for the aberration correction at infinity and thus, it becomes possible to realize a lens system in which variations in aberrations are small from infinity to the short distance.

I claim:

1. A photographic lens of a great aperture ratio in which the performance of short distance photography is maintained well, said photographic lens comprising, in succession from the object side, a first unit having a positive refractive power, a second unit having a positive refractive power, a third unit having a positive refractive power, and a stop member disposed between said first unit and said second unit, said first, second and third units being movable at different speeds toward the object side relative to the image plane during the shift from the infinity photography condition to the short distance photography condition, said photographic lens satisfying the following conditions:

$$1.5 < \alpha < 9.0 \tag{1}$$

$$0.2 < \beta < 3.0 \tag{2}$$

where when the amount of variation in the spacing between said first unit and said second unit resulting from the movement of each unit for the focusing to the infinity object to the closest distance object is $\Delta D_1$ and the amount of variation in the spacing between said second unit and said third unit is $\Delta D_2$ and the amount of variation in the spacing between said third unit and the image plane is $\Delta B_f$, $\alpha$ and $\beta$ are defined as follows:

$$\alpha = \Delta B_f / \Delta D_1,$$

$$\beta = \Delta D_2 / \Delta D_1.$$

2. A photographic lens according to claim 1, further satisfying the following conditions:

$$2.40 < f_1/f < 4.50 \tag{3}$$

$$1.41 < f_2/f < 1.80 \tag{4}$$

$$1.70 < f_3/f < 3.0 \tag{5}$$

where $f_1$, $f_2$ and $f_3$ are the focal lengths of said first unit, said second unit and said third unit, respectively, and f is the total focal length of the entire system.

3. A photographic lens according to claim 2, wherein said first unit has in the order from the object side a positive meniscus lens having its convex surface facing the object side, a positive meniscus lens having its convex surface facing the object side, and a negative meniscus lens having its convex surface facing the object side, said second unit has a negative lens having its concave surface of sharper curvature facing the object side, a positive lens cemented thereto and having its surface of sharper curvature facing the image side, and a positive meniscus lens having its convex surface facing the image side, and said third unit has a biconvex positive lens.

4. A photographic lens according to claim 3, wherein numerical data are as follows:

Focal length f = 51.6 F-number 1.4 Angle of view 2w = 46°

| | | | | |
|---|---|---|---|---|
| $r_1 = 41.885$ | $d_1 = 4.8$ | $n_1 = 1.79668$ | $v_1 = 45.5$ | $L_1$ |
| $r_2 = 323.527$ | $d_2 = 0.1$ | | | |
| $r_3 = 27.794$ | $d_3 = 5.0$ | $n_2 = 1.79631$ | $v_2 = 41$ | $L_2$ ⎫ $G_1$ |
| $r_4 = 41.731$ | $d_4 = 1.7$ | | | |
| $r_5 = 86.627$ | $d_5 = 1.6$ | $n_3 = 1.69895$ | $v_3 = 30.1$ | $L_3$ |
| $r_6 = 18.136$ | $d_6 =$ variable ($D_1$) | | | |
| $r_7 = -17.038$ | $d_7 = 1.0$ | $n_4 = 1.72825$ | $v_4 = 28.3$ | $L_4$ |
| $r_8 = -400.000$ | $d_8 = 7.0$ | $n_5 = 1.79668$ | $v_5 = 45.5$ | $L_5$ ⎫ $G_2$ |
| $r_9 = -27.275$ | $d_9 = 0.2$ | | | |
| $r_{10} = -105.064$ | $d_{10} = 4.4$ | $n_6 = 1.71300$ | $v_6 = 54$ | $L_6$ |
| $r_{11} = -31.505$ | $d_{11} =$ variable ($D_2$) | | | |
| $r_{12} = 125.000$ | $d_{12} = 2.8$ | $n_7 = 1.77279$ | $v_7 = 49.4$ | $L_7$-$G_3$ |
| $r_{13} = -210.375$ | $B_f =$ variable | | | |

Stop S is located 7.0 ahead of surface $r_7$.

| | $f = 51.6$ | $\beta = -0.15$ | |
|---|---|---|---|
| $d_0$ | $\infty$ | 359.714 | |
| $d_6$ | 15.195 | 16.776 | $\Delta D_1 = 1.581$ |
| $d_{11}$ | 0.916 | 3.083 | $\Delta D_2 = 2.167$ |
| $B_f$ | 38.119 | 45.077 | $\Delta B_f = 6.958$ |
| | $\alpha = 4.40$ | $f_1 = 177.768$ | |
| | $\beta = 1.37$ | $f_2 = 85.103$ | |
| | | $f_3 = 101.835$ | | where $r_1, r_2, r_3, \ldots$ represent the radii of curvature of the successive lens surfaces from the object side, $d_1, d_2, d_3, \ldots$ represent the center thicknesses and air spaces of the respective lenses, $n_1, n_2, n_3, \ldots$ and $v_1, v_2, v_3, \ldots$ represent the refractive indices and Abbe numbers, respectively, of the respective lenses, and $d_0$ represents the object distance from the foremost lens surface.

5. A photographic lens according to claim 3, wherein numerical data are as follows:

Focal length f = 51.6 F-number 1.4 Angle of view 2w = 45.8°

| | | | | |
|---|---|---|---|---|
| $r_1 = 54.000$ | $d_1 = 4.5$ | $n_1 = 1.77279$ | $v_1 = 49.4$ | $L_1$ |
| $r_2 = 3692.059$ | $d_2 = 0.1$ | | | |
| $r_3 = 26.393$ | $d_3 = 5.0$ | $n_2 = 1.87739$ | $v_2 = 38.1$ | $L_2$ ⎫ $G_1$ |
| $r_4 = 41.356$ | $d_4 = 1.8$ | | | |
| $r_5 = 85.078$ | $d_5 = 1.5$ | $n_3 = 1.69895$ | $v_3 = 30.1$ | $L_3$ |
| $r_6 = 18.695$ | $d_6 =$ variable ($D_1$) | | | |
| $r_7 = -17.947$ | $d_7 = 1.5$ | $n_4 = 1.75520$ | $v_4 = 27.6$ | $L_4$ |
| $r_8 = -200.000$ | $d_8 = 6.2$ | $n_5 = 1.78797$ | $v_5 = 47.5$ | $L_5$ ⎫ $G_2$ |
| $r_9 = -27.271$ | $d_9 = 0.1$ | | | |
| $r_{10} = -142.734$ | $d_{10} = 4.6$ | $n_6 = 1.77279$ | $v_6 = 49.4$ | $L_6$ |
| $r_{11} = -33.578$ | $d_{11} =$ variable ($D_2$) | | | |
| $r_{12} = 143.000$ | $d_{12} = 2.2$ | $n_7 = 1.80411$ | $v_7 = 46.4$ | $L_7$-$G_3$ |
| $r_{13} = -519.733$ | $B_f =$ variable | | | |

Stop S is located 6.7 ahead of surface $r_7$.

| | $f = 51.6$ | $\beta = -0.15$ | |
|---|---|---|---|
| $d_0$ | $\infty$ | 365.642 | |
| $d_6$ | 13.4 | 15.416 | $\Delta D_1 = 2.016$ |
| $d_{11}$ | 0.8 | 2.413 | $\Delta D_2 = 1.613$ |
| $B_f$ | 38.356 | 45.210 | $\Delta B_f = 6.854$ |
| | $\alpha = 3.40$ | $f_1 = 155.502$ | |
| | $\beta = 0.80$ | $f_2 = 73.483$ | |

-continued

Focal length f = 51.6 F-number 1.4 Angle of view 2w = 45.8°

$f_3 = 139.671$ where $r_1, r_2, r_3, \ldots$ represent the radii of curvature of the successive lens surface from the object side, $d_1, d_2, d_3, \ldots$ represent the center thicknesses and air spaces of the respective lenses, $n_1, n_2, n_3, \ldots$ and $v_1, v_2, v_3, \ldots$ represent the refractive indices and Abbe numbers, respectively, of the respective lenses, and $d_0$ represents the object distance from the foremost lens surface.

6. A photographic lens according to claim 3, wherein numerical data are as follows:

Focal length f = 51.6 F-number 1.2 Angle of view 2w = 46.4°

| | | | | |
|---|---|---|---|---|
| $r_1 = 47.070$ | $d_1 = 5.3$ | $n_1 = 1.79668$ | $v_1 = 45.5$ | $L_1$ |
| $r_2 = 184.282$ | $d_2 = 0.6$ | | | |
| $r_3 = 29.920$ | $d_3 = 7.15$ | $n_2 = 1.79631$ | $v_2 = 41.0$ | $L_2$ ⎫ $G_1$ |
| $r_4 = 50.000$ | $d_4 = 2.0$ | | | |
| $r_5 = 60.500$ | $d_5 = 1.0$ | $n_3 = 1.71736$ | $v_3 = 29.5$ | $L_3$ |
| $r_6 = 17.728$ | $d_6 =$ variable ($D_1$) | | | |
| $r_7 = -17.500$ | $d_7 = 1.3$ | $n_4 = 1.75520$ | $v_4 = 27.6$ | $L_4$ |
| $r_8 = 1000.000$ | $d_8 = 8.45$ | $n_5 = 1.77279$ | $v_5 = 49.4$ | $L_5$ ⎫ $G_2$ |
| $r_9 = -28.000$ | $d_9 = 0.1$ | | | |
| $r_{10} = -142.000$ | $d_{10} = 6.8$ | $n_6 = 1.77279$ | $v_6 = 49.4$ | $L_6$ |
| $r_{11} = -35.940$ | $d_{11} =$ variable ($D_2$) | | | |
| $r_{12} = 92.000$ | $d_{12} = 3.3$ | $n_7 = 1.7443$ | $v_7 = 49.5$ | $L_7$-$G_3$ |
| $r_{13} = -277.852$ | $B_f =$ variable | | | |

Stop S is located 8.7 ahead of surface $r_7$.

| | $f = 51.610$ | $\beta = -0.1$ | |
|---|---|---|---|
| $d_0$ | $\infty$ | 514.966 | |
| $d_6$ | 17.6 | 18.251 | $\Delta D_1 = 0.651$ |
| $d_{11}$ | 0.516 | 2.003 | $\Delta D_2 = 1.487$ |
| $B_f$ | 38.049 | 42.756 | $\Delta B_f = 4.707$ |
| | $\alpha = 7.23$ | $f_1 = 198.631$ | |
| | $\beta = 2.28$ | $f_2 = 81.922$ | |
| | | $f_3 = 93.198$ | | where $r_1, r_2, r_3, \ldots$ represent the radii of curvature of the successive lens surfaces from the object side, $d_1, d_2, d_3, \ldots$ represent the center thicknesses and air spaces of the respective lenses, $n_1, n_2, n_3, \ldots$ and $v_1, v_2, v_3, \ldots$ represent the refractive indices and Abbe numbers, respectively, of the respective lenses, and $d_0$ represents the objective distance from the foremost lens surface.

7. A photographic lens of a great aperture ratio which has F-number 1.4 or higher brightness and in which the performance of short distance photography is maintained well, said photographic lens comprising, in succession from the object side, a first lens unit of positive refractive power having a positive meniscus lens component most adjacent to the object side and having its convex surface facing the object side, a second lens unit of positive refractive power having a plurality of lens components, and a third lens unit of positive refractive power having a biconvex positive lens component, said first, second and third lens units being movable along the optical axis by different amounts relative to the image plane, and during the shift from the infinity photography condition to the short distance photography condition, the amount of movement of said first lens unit being greater than that of said second lens unit, and the amount of movement of said second lens unit being greater than that of said third lens unit, and wherein the refractive index of the biconvex positive lens in said third lens unit is greater than 1.6.

8. A photographic lens of a great aperture ratio which has F-number 1.4 or higher brightness and in which the performance of short distance photography is maintained well, said photographic lens comprising, in succession from the object side, a first lens unit of positive refractive power having a positive meniscus lens component most adjacent to the object side and having its convex surface facing the object side, a second lens unit of positive refractive power having a plurality of lens components, and a third lens unit of positive refractive power having a biconvex positive lens component, said first, second and third lens units being movable along the optical axis by different amounts relative to the image plane, and during the shift from the infinity photography condition to the short distance photography condition, the amount of movement of said first lens unit being greater than that of said second lens unit, and the amount of movement of said second lens unit being greater than that of said third lens unit, said photographic lens satisfying the following conditions:

$$2.5 < \Delta B_f/\Delta D_2 < 4.5,$$

wherein $\Delta D_2$ is the amount of variation in the spacing between said second lens unit and said third lens unit, and $\Delta B_f$ is the amount of variation in the spacing between said third lens unit and the image plane.

9. A photographic lens of a great aperture ratio in which the performance of short distance photography is maintained well, said photographic lens comprising, in succession from the object side, a first unit having a positive refractive power, a second unit having a positive refractive power, a third unit having a positive refractive power, and a stop member disposed between said first unit and said second unit, said first, second and third units being movable at different speeds toward the object side relative to the image plane during the shift from the infinity photography condition to the short distance photography condition, said photographic lens satisfying the following conditions:

$$1.5 < \alpha < 9.0$$

$$0.2 < \beta < 3.0$$

$$2.5 < \gamma < 4.5.$$

where when the amount of variation in the spacing between said first unit and said second unit resulting from the movement of each unit for the focusing to the infinity object to the closest distance object is $\Delta D_1$ and the amount of variation in the spacing between said second unit and said third unit is $\Delta D_2$ and the amount of variation in the spacing between said third unit and the image plane is $\Delta B_f$, $\alpha$, $\beta$ and $\gamma$ are defined as follows:

$$\alpha = \Delta B_f/\Delta D_1,$$

$$\beta = \Delta D_2/\Delta D_1,$$

$$\gamma = \Delta B_f/\Delta D_2.$$

10. A photographic lens according to claim 9, wherein said biconvex positive lens of said third unit is a single biconvex positive lens.

* * * * *